(12) United States Patent
Udo (10) Patent No.: US 11,040,654 B2
(45) Date of Patent: Jun. 22, 2021

(54) CONTROL APPARATUS

(71) Applicant: HONDA MOTOR CO., LTD., Tokyo (JP)

(72) Inventor: Takeshi Udo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/816,680

(22) Filed: Mar. 12, 2020

(65) Prior Publication Data

US 2020/0307450 A1     Oct. 1, 2020

(30) Foreign Application Priority Data

Mar. 29, 2019   (JP) .............................. JP2019-066646

(51) Int. Cl.
  *B60Q 3/54*  (2017.01)
  *B60R 1/04*  (2006.01)

(52) U.S. Cl.
  CPC .................. *B60Q 3/54* (2017.02); *B60R 1/04* (2013.01); *B60Q 2500/10* (2013.01)

(58) Field of Classification Search
  CPC ..................................... B60Q 3/54; B60R 1/04
  See application file for complete search history.

(56) References Cited

U.S. PATENT DOCUMENTS

| | | | |
|---|---|---|---|
| 2005/0231969 A1* | 10/2005 | Fogg ...................... | B60Q 3/258 362/494 |
| 2007/0154063 A1* | 7/2007 | Breed ............... | B60R 21/01538 382/100 |
| 2010/0020560 A1* | 1/2010 | Padilla ..................... | B60Q 3/74 362/490 |
| 2010/0214795 A1* | 8/2010 | Salter ....................... | B60Q 3/54 362/488 |
| 2010/0232171 A1* | 9/2010 | Cannon ............. | B29C 45/14811 362/509 |
| 2011/0222302 A1* | 9/2011 | Hodgson .................. | B60Q 3/80 362/490 |

FOREIGN PATENT DOCUMENTS

JP          62-79626        5/1987

OTHER PUBLICATIONS

Japanese Office Action dated Feb. 2, 2021 with English translation, 5 pages.

* cited by examiner

*Primary Examiner* — Bryon T Gyllstrom
*Assistant Examiner* — Christopher E Dunay
(74) *Attorney, Agent, or Firm* — Rankin, Hill & Clark LLP (57) ABSTRACT

A control apparatus includes a switch that operates a device, the switch being attached to a vehicle ceiling part, wherein a display able to transmit light from a light source is provided on an operation surface of an operation element of a switch, and in the operation element, an inclined part inclined with an upward slope from a vehicle front toward a vehicle rear is provided, the slope being inclined at an angle at which light radiated from the light source is not visually recognized by an occupant when the light radiated from the light source is reflected on a rearview mirror.

2 Claims, 5 Drawing Sheets

CONTROL APPARATUS

INCORPORATION BY REFERENCE

The present application claims priority under 35 U.S.C. § 119 to Japanese Patent Application No. 2019-066646 filed on Mar. 29, 2019. The content of the applications is incorporated herein by reference in its entirety.

BACKGROUND OF THE INVENTION

Field of the Invention

The present invention relates to a control apparatus.

Description of the Related Art

There is conventionally known a control apparatus provided in the roof of a vehicle. The control apparatus includes a plurality of switches which perform operations and the like of various devices mounted on the vehicle, and on the top of the operation element of each switch, a display is provided for presenting the role of the switch, the action thereof when the switch is operated, and the like by means of signs, characters and/or the like.

Moreover, there is known such a control apparatus which further includes light sources at places positioned on the back surfaces of the respective operation elements and in which the displays are formed to be able to transmit light. This control apparatus allows an occupant to easily visually recognize the positions of the operation elements, the actions caused by the operation elements being operated, and the like by means of light beams, of the light sources, emitted from the displays (for example, see Japanese Utility Model Laid-Open No. 62-079626).

SUMMARY OF THE INVENTION

However, in the case where such a control apparatus is provided at a place close to a rearview mirror, its conventional configuration has occasionally caused, when an occupant views the rearview mirror, light emitted from the display to be viewed on the rearview mirror and to disturb the rear field of view.

An object of an aspect of the present invention is to provide a control apparatus capable of preventing light from a display reflected on a rearview mirror from being visually recognized by an occupant.

An aspect of the present invention is a control apparatus including a switch that operates a device, the switch being attached to a vehicle ceiling part, wherein a display able to transmit light from a light source is provided on an operation surface of an operation element of the switch, and in the operation element, an inclined part inclined with an upward slope from a vehicle front toward a vehicle rear is provided, the slope being inclined at an angle at which light radiated from the light source is not visually recognized by an occupant when the light radiated from the light source is reflected on a rearview mirror.

In the aforementioned control apparatus according to an aspect of the present invention, the control apparatus may include an indicator for presenting a state of the device to the occupant, wherein a light-emitting part of the indicator is arranged in a recess part of the control apparatus, a surface on which the recess part is provided is inclined with an upward slope from a vehicle front toward a vehicle rear, and the light-emitting part is inclined with an upward slope from a vehicle front toward a vehicle rear.

In the aforementioned control apparatus according to an aspect of the present invention, among projection parts formed by providing recess parts in the control apparatus, a projection part on a vehicle front side may be disposed on a straight line connecting the light-emitting part and the rearview mirror.

According to these aspects of the present invention, light from a display reflected on a rearview mirror can be prevented from being visually recognized by an occupant.

DETAILED DESCRIPTION OF THE PREFERRED EMBODIMENTS

Hereafter, embodiments of the present invention are described with reference to the drawings.

Hereafter, embodiments of the present invention are described with reference to the drawings.

Figure 1:
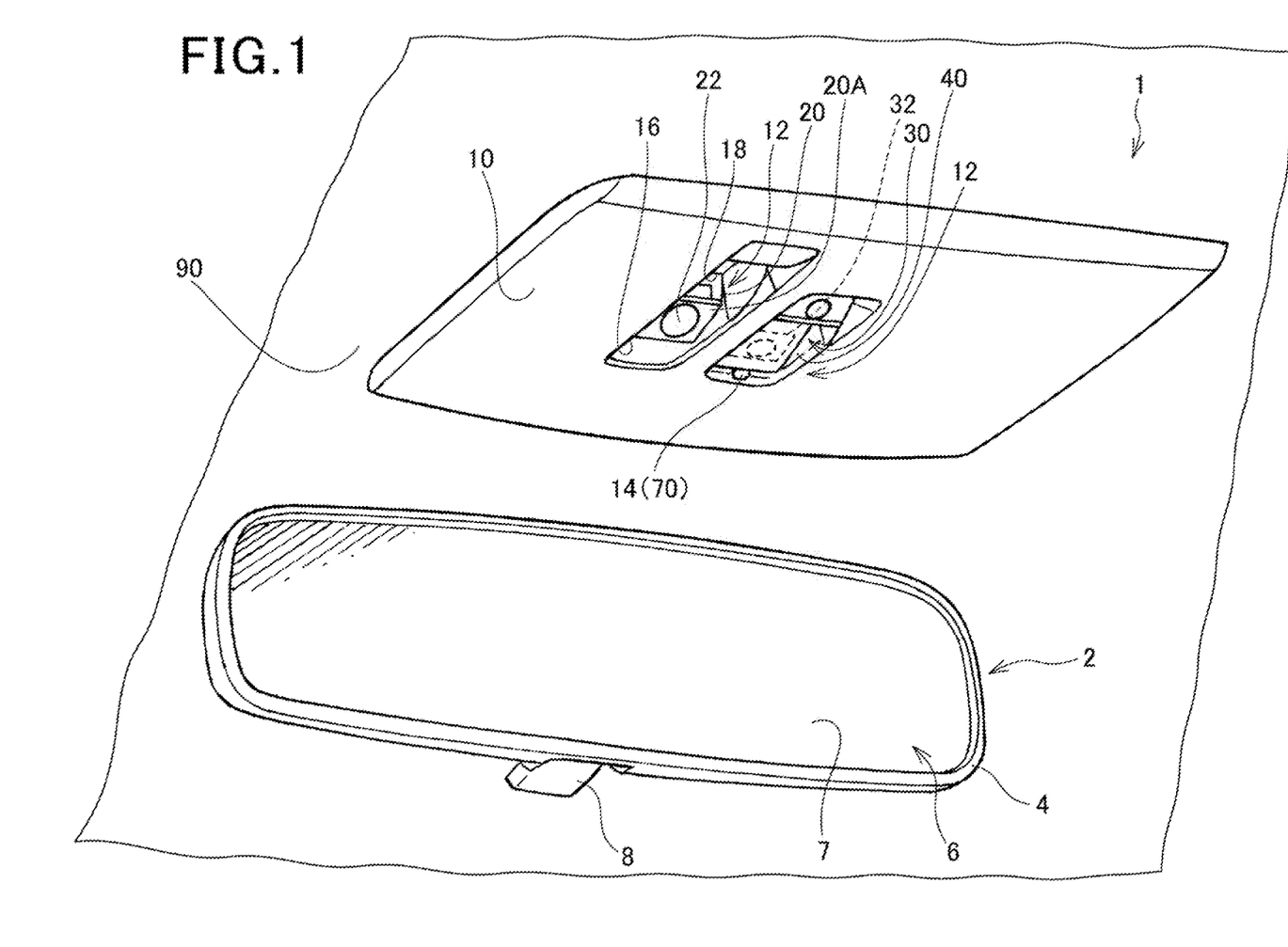
FIG. 1 is a perspective view showing a configuration of a control apparatus according to an embodiment of the present invention.

FIG. 1 is a perspective view of a control apparatus 1 according to an embodiment of the present invention. Notably, FIG. 1 shows only one switch 12 and one emergency call switch 30 in the control apparatus 1 for convenience of description.

Figure 2:
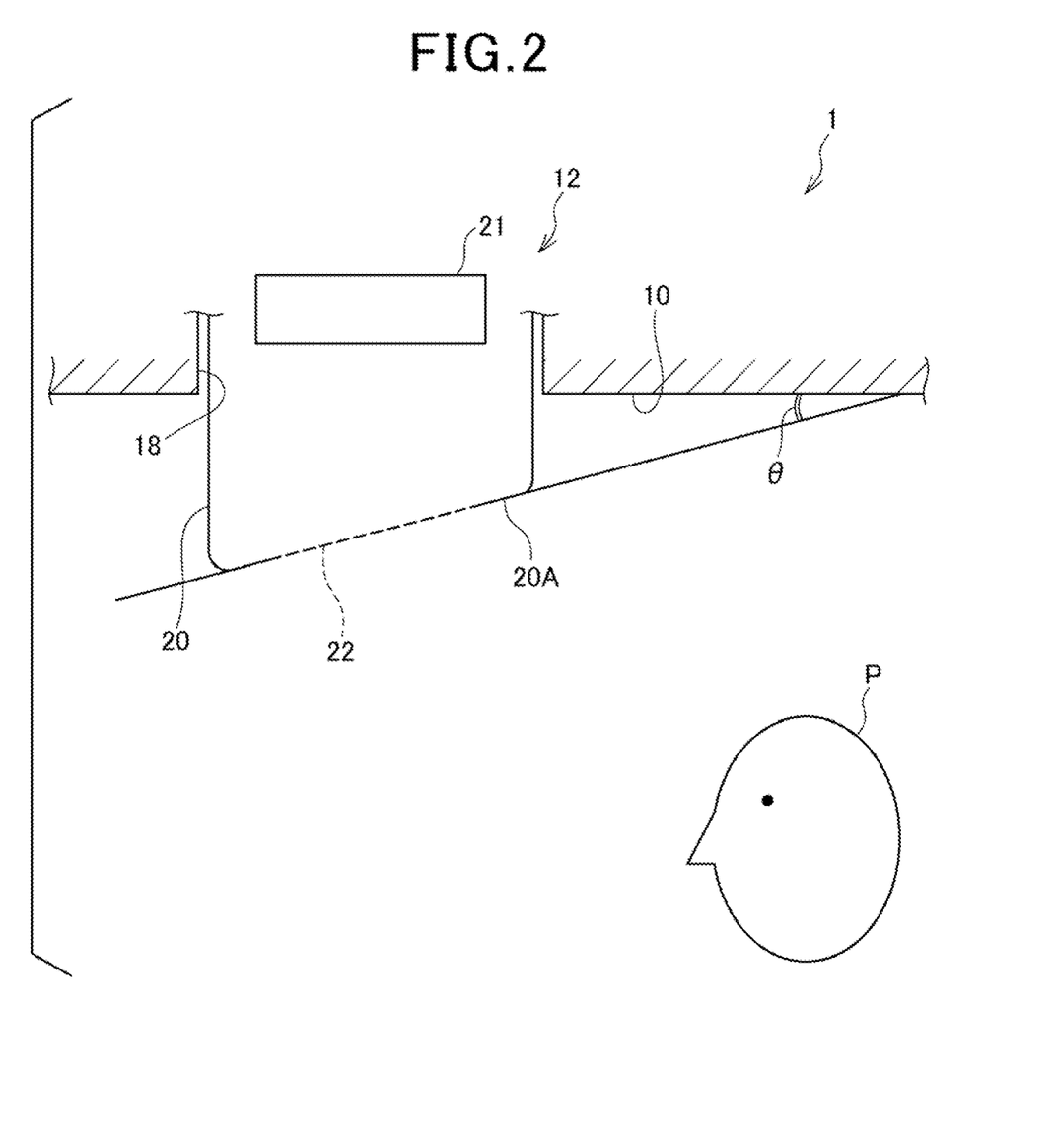
FIG. 2 is a diagram showing relation between an operation element provided in the control apparatus and an occupant.

As shown in FIG. 1, the control apparatus 1 is provided on a vehicle ceiling part 90 of an automobile or the like, and is an apparatus which operates various devices mounted on the vehicle. The control apparatus 1 of the present embodiment is provided close to a rearview mirror 2 provided on the vehicle ceiling part 90. Specifically, the control apparatus 1 is provided above the rearview mirror 2, a dashboard, an instrument panel and the like, and disposed at a place positioned frontward of an occupant P (FIG. 2).

Moreover, the control apparatus 1 is disposed between the rearview mirror 2 and the occupant P in the vehicle front-rear direction, and disposed at a position closer to the rearview mirror 2 between the rearview mirror 2 and the occupant P.

Notably, while in the present embodiment, the occupant P is supposed to be a driver, not limited to this, he/she may be any occupant boarding on the vehicle.

The control apparatus 1 includes an operation panel 10, a plurality of switches 12, and an indicator 14.

The operation panel 10 constitutes a front surface of the control apparatus 1, and the operation panel 10 is provided to face a space inside the vehicle. A plurality of operation element containing parts 16 are provided in the operation panel 10. Each operation element containing part 16 is formed to have a concave shape which is recessed from the operation panel 10 toward the vehicle ceiling part 90, and an opening part 18 which is a through hole is provided on a bottom surface of each of the operation element containing parts 16.

Moreover, opening parts 18 are also provided at a plurality of predetermined places in the operation panel 10.

FIG. 2 is a diagram showing relation between an operation element 20 provided in the control apparatus 1 and the occupant P. FIG. 2 shows a display 22 with a broken line for convenience of description.

The plurality of switches 12 operate various devices by being operated by the occupant P, and as shown in FIG. 2, each switch 12 includes the operation element 20 and a light source 21. The operation element 20 of the present embodiment is a knob. Each operation element 20 is inserted into the corresponding opening part 18 from the rear surface toward the front surface of the operation panel 10, and thereby, protrudes from the operation panel 10. Notably, the operation element 20 protrudes from the opening part 18 with a height dimension at which it does not protrudes outward from the height dimension of the recess of the operation element containing part 16.

An operation surface 20A positioned on the ceiling surface of each operation element 20 is provided from the vehicle front toward the vehicle rear in the front-rear direction of the vehicle. Each is provided with an upward slope at a predetermined angle θ. Namely, the operation surface 20A is an inclined part provided in the operation element 20. Moreover, the operation surface 20A is provided to face the occupant P.

The display 22 is provided in the operation surface 20A positioned on the ceiling surface of each operation element 20. Each display 22 is formed to have shapes with characters and/or signs representing a device operated by operating the corresponding switch 12, an action caused thereby, and the like. Each display 22 is formed of a member able to transmit light.

Since the operation surface 20A is provided to face the occupant P as mentioned above, each display 22 is to also face the occupant P. Therefore, when the occupant P views each display 22, distortion of the display 22 can be prevented, which improves visibility.

The light source 21 is provided at a place positioned on a back surface (rear side surface) of the operation element 20 of each switch 12, and the light source 21 lights up the display 22 from the back surface of the operation element 20. An LED is used for the light source 21 of the present embodiment. Notably, the light source 21 is not limited to an LED but may be a halogen lamp or the like.

Illumination light from the light source 21 is transmitted through the display 22 to be emitted to a space inside the vehicle. Thereby, the occupant P can visually recognize each switch 12, the operation caused by operating the switch 12, and the like even in the dark. The light source 21 of the present embodiment outputs the illumination light such that the display 22 has a predetermined brightness.

Figure 3:
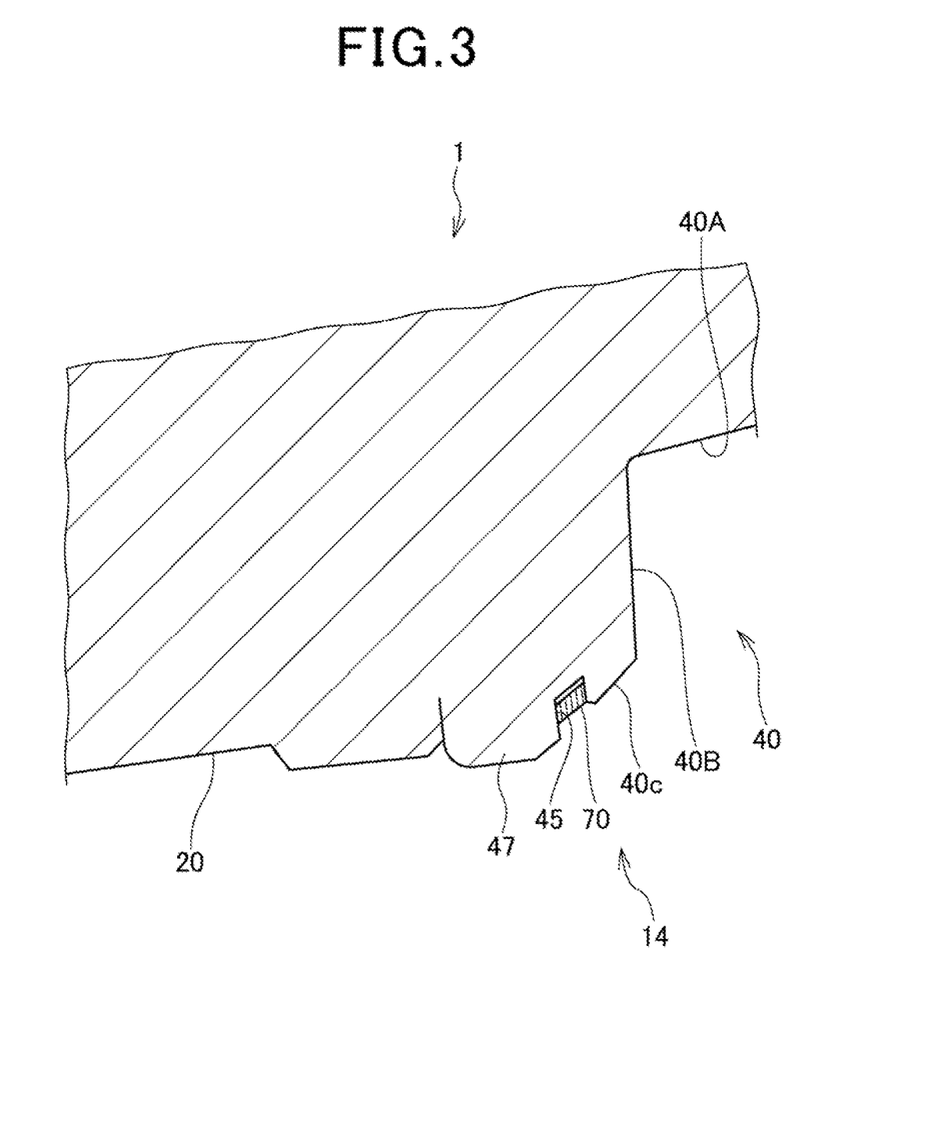
FIG. 3 is a longitudinal-sectional view showing a schematic configuration of an indicator in the front-rear direction of a vehicle.

FIG. 3 is a longitudinal-sectional view showing a schematic configuration of the indicator 14 in the vehicle front-rear direction.

As shown in FIG. 3, the indicator 14 is disposed near a predetermined switch 12, and is a display device which presents, to the occupant P, the state of any of various devices mounted on the vehicle, or the state of the switch 12. In the present embodiment, the indicator 14 is provided close to an emergency call switch 30 for capability to call a police station, a firehouse and/or the like.

The indicator 14 includes a light-emitting part 70. The light-emitting part 70 includes an LED. Note that, not limited to the LED, the light-emitting part 70 may include, for example, a lamp. The light-emitting part 70 is turned on, is turned off or blinks, and changes the color of the light emission in accordance with the situation of operation of the predetermined switch 12 or device, the ability or inability of use thereof, and the like, and the light-emitting part 70 is provided in the operation panel 10. In the present embodiment, the light-emitting part 70 is controlled in terms of being turned on in accordance with the situation of operation and the state of use of the emergency call switch 30, the state of the device operated by the emergency call switch 30 being operated, and the like.

Notably, in the present embodiment, the brightness of the light-emitting part 70 is higher than the brightness of the light source 21 at the display 22.

In detail, the indicator 14 is provided close to an emergency call operation element containing part 40 which is one of the operation element containing parts 16.

An emergency call operation element 32 which is the operation element of the emergency call switch 30 is housed in the emergency call operation element containing part 40 similarly to the other switches 12.

The emergency call operation element containing part 40 being described in detail, the emergency call operation element containing part 40 includes a bottom surface 40A, lateral surfaces 40B and a continuous surface 40C.

An opening part 42 is provided in the center part of the bottom surface 40A.

The lateral surfaces 40B stand from the bottom surface 40A downward, and are disposed to face the respective lateral surfaces of the emergency call operation element 32 so as to enclose the emergency call operation element 32.

The continuous surface 40C couples the lateral surfaces 40B and the operation panel 10 together, and the continuous surface 40C is formed as an inclined surface inclined with an upward slope toward the bottom surface 40A in sectional view in the vehicle up-down direction.

A recess part 45 and a projection part 47 are provided on the continuous surface 40C.

The recess part 45 is formed to have a concave shape which is recessed from the continuous surface 40C toward the vehicle ceiling part 90, and the recess part 45 is disposed frontward of the emergency call operation element 32 in the vehicle front-rear direction. Namely, the continuous surface 40C at the place where the recess part 45 is provided is a surface inclined with an upward slope from the vehicle front toward the vehicle rear. The light-emitting part 70 of the indicator 14 is housed in the recess part 45. The light-emitting part 70 arranged in the recess part can be visually recognized by the occupant P.

Moreover, the light-emitting part 70 is provided to be inclined with an upward slope from the vehicle front toward the vehicle rear, the upward slope being substantially identical to that of the continuous surface 40C. Namely, it is provided to face the occupant P similarly to the switches 12.

Thereby, visibility can be improved when the occupant P views the indicator 14. Moreover, there can be prevented a feeling of sinking that the occupant P feels as if the light-emitting part 70 sank inside the recess part 45 when he/she views the light-emitting part 70.

Furthermore, since the light-emitting part 70 is provided to face a direction apart from the rearview mirror 2, light emitted from the light-emitting part 70 can be prevented from being seen on the rearview mirror 2.

The projection part 47 is provided to be adjacent to the recess part 45, and the projection part 47 is disposed at a place positioned vehicle frontward of the recess part 45 in the vehicle front-rear direction.

The projection part 47 protrudes downward of the light-emitting part 70, and the tip of the projection part 47 is positioned on a straight line connecting the light-emitting part 70 and the rearview mirror 2. Namely, the tip of the projection part 47 is positioned between the light-emitting part 70 and the rearview mirror 2.

Thereby, light emitted from the light-emitting part 70 can be shielded by the projection part 47 and be prevented from entering the rearview mirror 2. Therefore, even the light, from the light-emitting part 70, having a high brightness can be prevented from being seen on the rearview mirror 2.

Next, the rearview mirror 2 is described.

The rearview mirror 2 of the present embodiment is attached to the vehicle ceiling part 90 similarly to the control apparatus 1. Specifically, the rearview mirror 2 is disposed between the control apparatus 1 and the occupant P in the vehicle up-down direction (height direction), and disposed at a position closer to the control apparatus 1 between the control apparatus 1 and the occupant P.

Notably, the rearview mirror 2 may be provided on a windshield of the vehicle.

The rearview mirror 2 is an anti-glare mirror, and as shown in FIG. 1, the rearview mirror 2 includes a mirror supporting part 3 (FIG. 4), a mirror housing 4, a mirror 6 and a lever 8.

The mirror housing 4 is a casing in a rectangular shape in front view, and the mirror housing 4 elongates its longitudinal direction along the vehicle width direction. The mirror 6 is fitted into the mirror housing 4 on the surface positioned on the rear side of the vehicle in the vehicle front-rear direction. The surface on which the mirror 6 is fitted is hereafter regarded as the front surface in the mirror housing 4.

Figure 4:
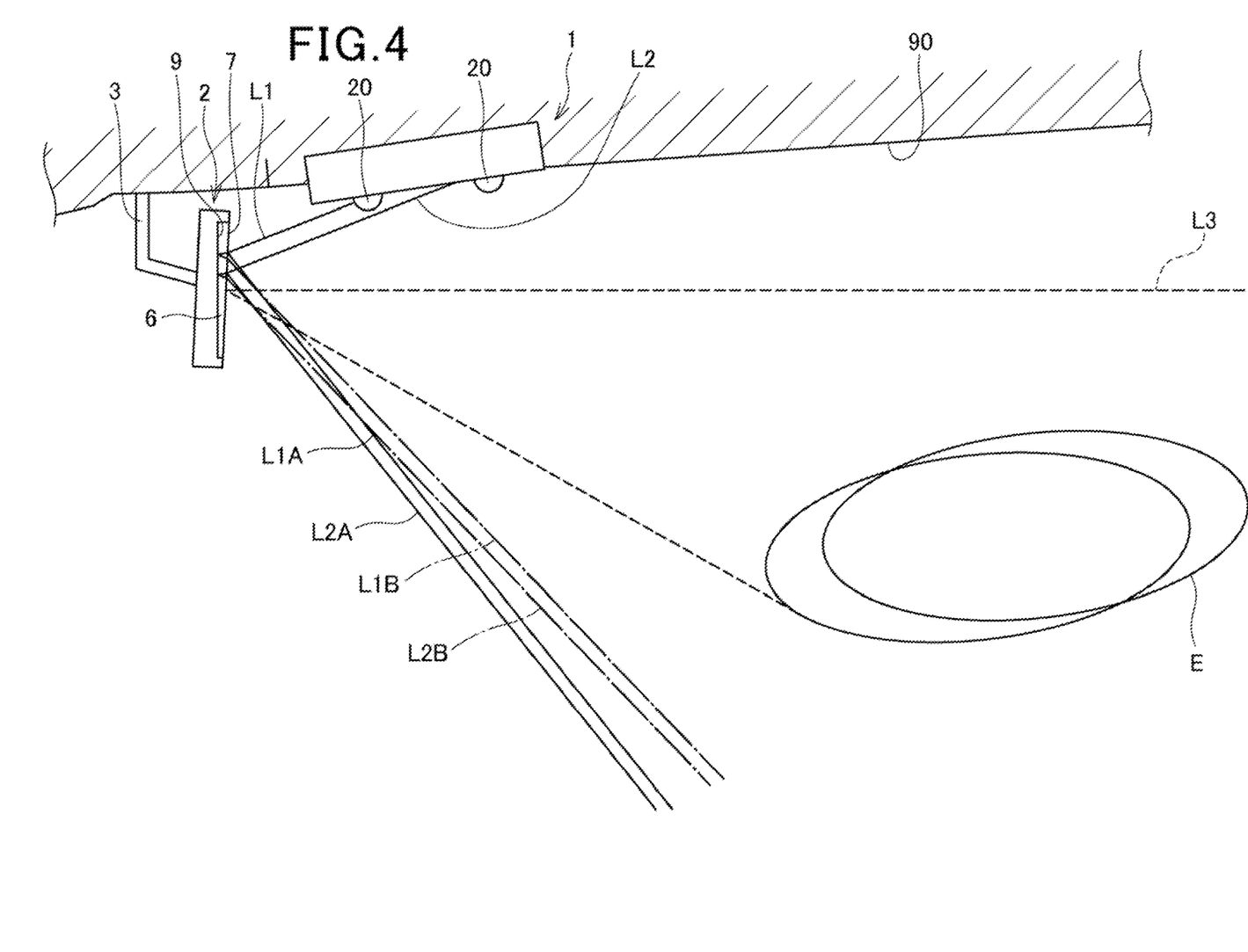
FIG. 4 is a diagram schematically showing primary reflected light of the light emitted from a display surface of the operation element.

The mirror supporting part 3 is an arm-like member, one end part of the mirror supporting part 3 is connected to the vehicle ceiling part 90, and the other end part is connected onto the back surface of the mirror housing 4. In the present embodiment, the mirror supporting part 3 and the mirror housing 4 are connected together via the structure of a ball joint. Therefore, the mirror housing 4 can be freely adjustable of its attaching angle by being caused to pivot around the ball joint.

The mirror 6 is a prism mirror, and the mirror 6 has a predetermined thickness and is formed so as to have a trapezoidal shape in a cross section in the up-down direction. In the mirror 6, a glass plane 7 is formed on the front surface, and a mirror plane 9 is formed on the rear surface. Since the mirror 6 has a trapezoidal cross section as mentioned above, the glass plane 7 and the mirror plane 9 are provided so as to form a predetermined angle.

The mirror 6 can use the glass plane 7 and the mirror plane 9 as respective reflecting mirrors with different reflectivities.

The lever 8 changes the angle of the rearview mirror 2 to switch an anti-glare effect of the mirror 6, and the lever 8 is provided at the center of the lower end part of the mirror housing 4. The lever 8 can be used in a non-anti-glare state by being pulled downward to orient the rearview mirror 2 downward.

The rearview mirror 2 is provided such that the mirror plane 9 faces the vehicle rear (rear window) as seen by the occupant P, in the non-anti-glare state.

Moreover, the lever 8 can be used in an anti-glare state by being pulled upward to orient the rearview mirror 2 upward.

The rearview mirror 2 is provided such that the glass plane 7 faces the vehicle rear (rear window) as seen by the occupant P, in the anti-glare state.

Figure 5:
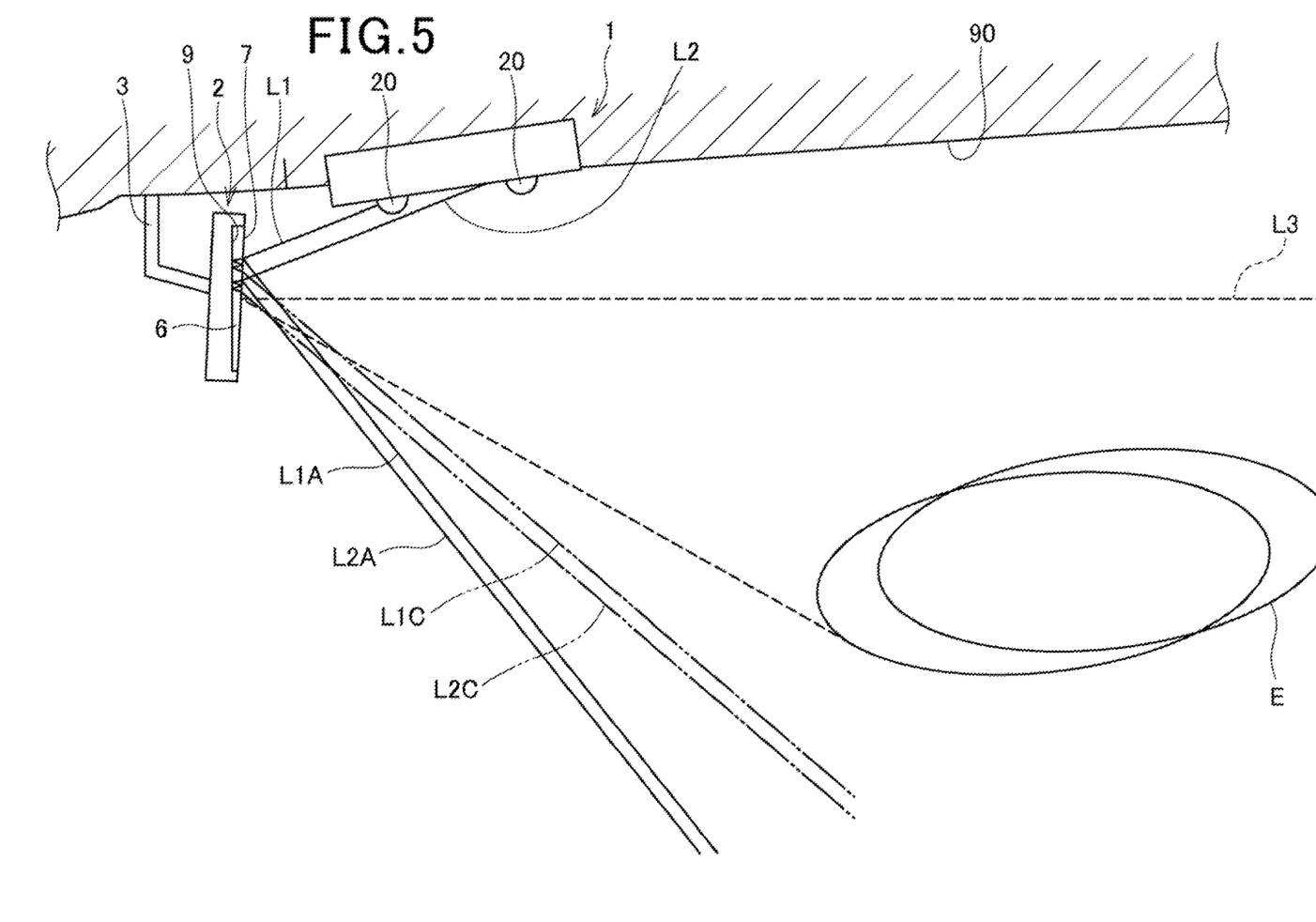
FIG. 5 is a diagram schematically showing secondary reflected light of the light emitted from the display surface of the operation element.

FIG. 4 is a diagram schematically showing primary reflected light L1B, L2B of emitted light L1, L2 from the display 22 of each operation element 20. FIG. 5 is a diagram schematically showing secondary reflected light L1C, L2C of the emitted light L1, L2 from the display 22 of each operation element 20. In FIG. 4 and FIG. 5, the rearview mirror 2 is used in the anti-glare state. Moreover, FIG. 4 and FIG. 5 each shows eyellipses E. Each eyellipse E is a region with which an eye range having a distribution of eye positions of a driver statistically presented is diagrammatically represented as an ellipse. The eyellipses E of the present embodiment are set based on the standards of JIS D0021 and ISO 4513.

When the rearview mirror 2 is oriented upward to be used in the anti-glare state, as shown in FIG. 4 and FIG. 5, the mirror 6 is in the state of being oriented in the direction of the vehicle ceiling part 90, that is, the control apparatus 1.

As mentioned above, light of each light source 21 is emitted from the display 22 included in the operation element 20 of the corresponding switch 12. As shown in FIG. 4 and FIG. 5, the emitted light L1, L2 which is a part of the light advances toward the mirror 6 of the rearview mirror 2.

As mentioned above, the operation surface 20A included in the operation element 20 of each switch 12 is provided to be included at the predetermined angle θ so as to face the occupant P. Therefore, each reflected light L1A, L2A resulting from the corresponding emitted light L1, L2 being reflected on the glass plane 7 of the mirror 6 advances in a direction deviated from the eyellipses E, specifically, a direction downward of the eyellipses E.

Moreover, as mentioned above, the mirror 6 is a prism mirror having a predetermined thickness. Therefore, the emitted light L1, L2 passes through the glass plane 7 to enter the inside of the mirror 6. In this stage, the emitted light L1, L2 is reflected on the mirror plane 9 once or a plurality of times between the glass plane 7 and the mirror plane 9, and after that, is emitted from the inside of the mirror 6. The light emitted from the inside of the mirror 6 is refracted in a different direction from that of the reflected light L1A, L2A due to the cross section of the mirror 6 being formed into a trapezoidal shape.

For example, the primary reflected light L1B, L2B resulting from one-time reflection on the mirror plane 9 inside the mirror 6 as shown in FIG. 4 is emitted from the inside of the mirror 6 at a gentler angle than the reflected light L1A, L2A. Therefore, the primary reflected light L1B, L2B advances in a direction closer to the eyellipses E than the reflected light L1A, L2A.

Likewise, the secondary reflected light L1C, L2C resulting from two reflections on the mirror plane 9 inside the mirror 6 as shown in FIG. 5 is emitted from the inside of the mirror 6 at a gentler angle than the reflected light L1A, L2A and the primary reflected light L1B, L2B. Therefore, the secondary reflected light L1C, L2C advances in a direction closer to the eyellipses E than the reflected light L1A, L2A and the primary reflected light L1B, L2B.

Since the operation surfaces 20A are sufficiently inclined, even in such cases, each of the primary reflected light L1B, L2B and the secondary reflected light L1C, L2C advances in a direction deviated from the eyellipses E.

Herein supposed that the count of reflections of the reflected light on the mirror plane 9 inside the mirror 6 is n, and that the reflected light the count of reflections of which is n is nth reflected light, where n=1, 2 . . . , the nth reflected light is emitted from the inside of the mirror at a gentler angle as its count of reflections increases more. Namely, the nth reflected light advances in a direction closer to the eyellipses E as its count of reflections increases more. Therefore, a part of the nth reflected light occasionally advances toward the eyellipses E.

Even in such a case, by the operation surface 20A being provided to be sufficiently inclined, the nth reflected light that advances toward the eyellipses E is attenuated to such an extent that it is not visually recognized by the occupant P.

Therefore, the nth reflected light is not visually recognized by the occupant P at any count of reflections.

Namely, only external light L3 from the rear is to reach the eyellipses E as the light that can be visually recognized by the occupant P.

Notably, when the rearview mirror 2 is used in the non-anti-glare state, the mirror 6 is oriented more downward than the mirror plane in the anti-glare state. Therefore, the reflected light on the mirror 6 in the non-anti-glare state advances more downward than each beam of the reflected light in the anti-glare state, and all the beams of reflected light are deviated from the eyellipses E.

Since the operation surfaces 20A of the operation elements 20 are provided to be inclined as mentioned above, light emitted from the display 22 provided in each operation surface 20A can be prevented from being seen on the mirror 6 when the occupant P views the rearview mirror 2. Therefore, when viewing the mirror 6, the occupant P can visually recognize a rear field of view of the vehicle without being disturbed by light from the control apparatus 1.

According to the aforementioned embodiment, the following effects are achieved.

The control apparatus 1 of the present embodiment includes the switch 12 that operates a device, the switch 12 being attached to the vehicle ceiling part 90. The display 22 able to transmit light from the light source 21 is provided on the operation surface 20A of the operation element 20 of the switch 12. Further, the operation element 20 is configured to be inclined with an upward slope from a vehicle front toward a vehicle rear, the slope being inclined at an angle at which light radiated from the light source 21 is not visually recognized by the occupant P when the light radiated from the light source 21 is reflected on the rearview mirror 2.

Thereby, light from the display 22 provided in the operation surface 20A can be prevented from being seen on the mirror 6 when the occupant P views the rearview mirror 2. Therefore, when viewing the mirror 6, the occupant P can visually recognize a rear field of view of the vehicle without being disturbed by light from the control apparatus 1.

Moreover, according to the present embodiment, the control apparatus 1 includes the emergency call switch 30, and the indicator 14 for presenting the state of the device to the occupant P, and the light-emitting part 70 of the indicator 14 is arranged in the recess part 45 of the control apparatus. Further, the continuous surface 40C on which the recess part 45 is provided is configured to be inclined with an upward slope from a vehicle front toward a vehicle rear, and the light-emitting part 70 is configured to be inclined with an upward slope from a vehicle front toward a vehicle rear. Thereby, visibility can be improved when the occupant P views the indicator 14. Moreover, there can be prevented a feeling of sinking that the occupant P feels as if the light-emitting part 70 sank inside the recess part 45 when he/she views the light-emitting part 70.

Moreover, according to the present embodiment, the projection part 47 is configured to be disposed on a straight line connecting the light-emitting part 70 and the rearview mirror 2. Thereby, light emitted from the light-emitting part 70 can be shielded by the projection part 47 and be prevented from entering the rearview mirror 2.

The aforementioned embodiment is exemplarily presented as an aspect of the present invention, and can be arbitrarily modified and applied without departing from the spirit of the present invention.

For example, the operation element 20 and the emergency call operation element 32 may be provided to be entirely inclined such that the operation surfaces 20A face the occupant P side. In this case, the operation surface 20A of each operation element 20 and the operation surface of the emergency call operation element 32 may be provided not to be inclined.

While in the aforementioned embodiment, the switch 12 is configured such that the operation element 20 is housed inside the operation element containing part 16, not limited to this, it may be configured such that the opening part 18 is provided in the operation panel 10, the operation element containing part 16 not being provided, and the operation element 20 is inserted into this opening part 18. Moreover, in this case, the operation element 20 does not have to protrude from the operation panel 10, but the operation surface 20A may have a height dimension so as to form a substantially identical plane to that of the operation panel 10.

Likewise, the emergency call switch 30 may be configured such that the emergency call operation element containing part 40 is not provided in the operation panel 10, but the emergency call operation element 32 is inserted into the opening part 18.

While in the aforementioned embodiment, the light sources 21 are supposed to be provided on the back surfaces of the operation element 20 and the emergency call operation element 32, not limited to this, they may be provided at other places such that beams of illumination light from them are guided to the displays 22 via light guiding materials.

Moreover, for the aforementioned embodiment, the displays 22 may be formed of reflective materials, fluorescent materials, luminous materials, or the like, not limited to members able to transmit light. In this case, the switches 12 do not have to include the light sources 21.

REFERENCE SIGNS LIST

1 Control apparatus
2 Rearview mirror
4 Mirror housing
6 Mirror
8 Lever
10 Operation panel
12 Switch
14 Indicator
16 Containing part
18 Opening part
20 Operator
20A Operation surface (inclined part)
21 Light source
30 Emergency call switch
32 Emergency call operation element
40 Emergency call operation element containing part
40A Bottom surface
40B Lateral surface
40C Continuous surface
42 Opening part 45 Recess part
47 Projection part
70 Light-emitting part
90 Vehicle ceiling part
E Eyellipse
L1, L2 Emitted light
L1A, L2A Reflected light
L1B, L2B Primary reflected light
L1C, L2C Secondary reflected light
L3 External light
P Occupant
θ Angle

What is claimed is:

1. A control apparatus comprising
a switch that operates a device, the switch being attached to a vehicle ceiling part, wherein
the switch is disposed above a rearview mirror, disposed at a rear side of the rearview mirror in a vehicle front-rear direction and disposed separated from the rearview mirror, the rearview mirror being provided on the vehicle ceiling part or on a windshield of a vehicle,
a display able to transmit light from a light source to emit the light to a space inside the vehicle is provided on an operation surface of an operation element of the switch,
in the operation element, an inclined part inclined with an upward slope from a vehicle front toward a vehicle rear is provided, the slope being inclined at an angle at which light radiated from the display is not visually recognized by a driver in an eye range which has eye positions of the driver when the light radiated from the light source is reflected on the rearview mirror,
the display is disposed on the inclined part along the inclination of the inclined part,
a light-emitting part is arranged in a recess part of the control apparatus,
the control apparatus further comprises a projection part which is positioned vehicle frontward of the recess part in the vehicle front-rear direction, which is adjacent to the recess part and which protrudes downward of the light-emitting part, and
a tip of the projection part is disposed on a straight line connecting the light-emitting part and the rearview mirror so that light emitted from the light-emitting part toward the rearview mirror is shielded by the projection part.

2. The control apparatus according to claim 1, comprising
an indicator for presenting a state of the device to the occupant, wherein
the indicator includes the light-emitting part and the light-emitting part is arranged in the recess part of the control apparatus,
a surface on which the recess part is provided is inclined with an upward slope from a vehicle front toward a vehicle rear, and
the light-emitting part is inclined with an upward slope from the vehicle front toward the vehicle rear.

* * * * *